United States Patent
Fukuda et al.

(10) Patent No.: US 7,262,363 B2
(45) Date of Patent: Aug. 28, 2007

(54) ELECTRIC WIRE PROTECTIVE CAP

(75) Inventors: Masaru Fukuda, Shizuoka (JP); Harunori Tashiro, Shizuoka (JP); Chieko Torii, Shizuoka (JP); Takayuki Yamamoto, Shizuoka (JP); Masato Ozawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/172,864

(22) Filed: Jul. 5, 2005

(65) Prior Publication Data

US 2006/0005990 A1    Jan. 12, 2006

(30) Foreign Application Priority Data

Jul. 9, 2004    (JP) .............................. 2004-202967

(51) Int. Cl.
    *H01R 4/00*    (2006.01)
(52) U.S. Cl. ................................. 174/84 R; 174/84 C
(58) Field of Classification Search ............. 174/84 R, 174/84 C, 86, 87, 74 R, 76; 403/214, 265; 439/449
    See application file for complete search history.

(56) References Cited

U.S. PATENT DOCUMENTS

| | | | | |
|---|---|---|---|---|
| 2,792,444 A | * | 5/1957 | Bergan ........................ | 174/87 |
| 2,823,249 A | * | 2/1958 | Curtiss ........................ | 174/87 |
| 3,350,499 A | * | 10/1967 | Swanson ..................... | 174/87 |
| 3,937,870 A | * | 2/1976 | Bumpstead et al. .......... | 174/87 |
| 4,053,704 A | * | 10/1977 | Smith ........................... | 174/87 |
| 4,839,473 A | * | 6/1989 | Fox et al. ................. | 174/138 F |
| 5,151,239 A | * | 9/1992 | King, Jr. ................. | 264/272.11 |
| 5,427,270 A | * | 6/1995 | Patterson ..................... | 174/135 |
| 5,431,758 A | * | 7/1995 | Delalle ......................... | 156/49 |
| 6,025,559 A | * | 2/2000 | Simmons ...................... | 174/87 |
| 6,051,791 A | * | 4/2000 | King ............................. | 174/87 |
| 6,570,094 B2 | * | 5/2003 | King, Jr. ...................... | 174/87 |

FOREIGN PATENT DOCUMENTS

| | | |
|---|---|---|
| JP | 8-22847 | 1/1996 |
| JP | 10-243539 | 9/1998 |

* cited by examiner

*Primary Examiner*—William H. Mayo, III
(74) *Attorney, Agent, or Firm*—Kratz, Quintos & Hanson, LLP

(57) ABSTRACT

The present invention is to provide an electric wire protective cap. The protective cap can be formed easily by a resin molding and prevents a seal material from leaking and improves waterproof. The protective cap includes a cap main body with a bottom, and a cover to be fitted to the cap main body and having a hole to insert electric wires. A joint portion of the electric wires is inserted into the cap main body and locked or fixed by the cover. The cover has a locking portion for the joint portion and a locking portion for the cap main body. The cover is an elastic packing material. An outer wall of the cover contacts firmly with an inner wall of the cap main body. The electric wires contact firmly with the hole of the cover. An abutting portion is disposed in the cap main body to prevent the cover from being pulled out. The cover is formed from a disk plate by making a cutout in the hole and overlapping end surfaces of the cutout.

9 Claims, 4 Drawing Sheets

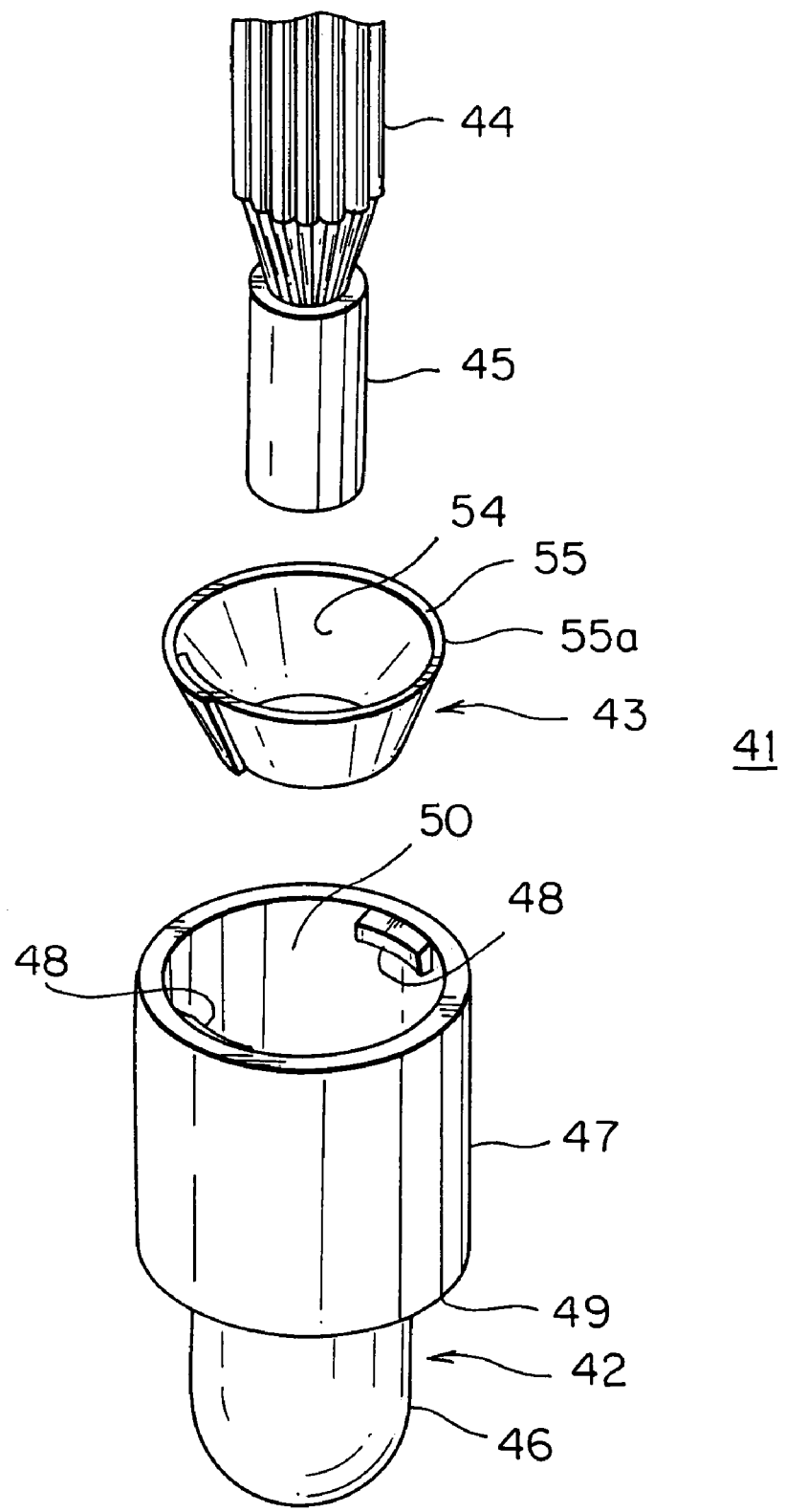
F I G. 3

ELECTRIC WIRE PROTECTIVE CAP

BACKGROUND OF THE INVENTION

1. Field of the Invention

The present invention relates to an electric wire protective cap to provide insulation and waterproof from outside to a joint portion of the electric wires of a wiring harness.

2. Description of the Related Art

FIG. 6 shows an embodiment of a conventional protective cap (pages 3 to 4, FIG. 1 in JP, H08-22847, A).

The electric wire protective cap 61 provides insulation and waterproof to a joint portion 66 of electric wires 67 of a wiring harness and is made of a synthetic resin and has a cap main body 62 with a bottom and a plurality of flexible locking lances 63 within the cap main body.

The locking lances 63 are formed at an opening 64 to be outwardly extending at thin hinges 65 when molding and are folded to be received into the cap main body after the molding. This originates from the difficulty of die-cutting of the locking lances 63 at the molding.

The joint portion 66 is formed in a manner that insulation sheaths of the plurality of the electric wires 67 are removed at ends of the electric wires to expose core wires and the core wires are inserted into an electrically conductive metal sleeve and depressed with the sleeve. Distal ends of the locking lances 63 abut to a rear end of the sleeve to prevent the joint portion 66 from being pulled out of the cap main body 62.

An improvement of waterproof by injecting a synthetic resin seal into the cap main body is disclosed in JP, H10-243539 (pages 3 to 4, FIGS. 1 to 5).

There are several problems in the conventional protective cap 61 as follows.

Since the locking lances 63 are arranged inside the cap main body 62, the production of the locking lance requires more time and cost. When the seal material is filled into the cap main body to achieve the waterproof of the joint portion, unless the seal material is completely solidified, the seal material spills outside of the cap main body when the main body lies down. When an effervescent sealing material is utilized, the seal material spills outside, even when the cap is hold upright, during solidification of the effervescent sealing material.

SUMMARY OF THE INVENTION

An object of the present invention is to provide an electric wire protective cap having locking lances easily manufactured and reliable waterproof by preventing leakage of a sealing material.

According to a first aspect of the present invention, an electric wire protective cap includes a cap main body having a bottom and a cylindrical shape, and a cover having a hole for inserting electric wires and to be fitted into the cap main body, whereby a joint portion is inserted into the cap main body, and the joint portion or the electric wires are locked or fixed by the cover.

Thereby, the cover fixing the electric wires or the joint portion is fixed to the cap main body and the joint portion is indirectly fixed to the cap main body. Locking lances of a conventional cap main body are not required. The cover prevents water and dust from entering into the cap main body. The cover prevents the seal material from leaking when the cap main body is filled with a synthetic resin. The joint portion is embedded into the seal material resulting in high waterproof. The cover and the seal material improve the waterproof. Either non-foaming type or foaming type can be used as the sealing material.

According to a second aspect of the present invention, the cover has a locking portion for the joint portion and a locking portion for the cap main body.

Thereby, the cover is locked by the locking portion (locking arm) and the joint portion is locked by the locking portion (locking lance). The locking portion is preferably flexible and can be the locking arm or the locking lance. The joint portion or the cover can be pulled out or detached from the cap main body by unlocking the locking portion. A recess or hole is disposed in the cap main body as a locked portion for the locking portion. The joint portion is locked to the cover and the assembly is locked to the cap main body. As other case, the cover is locked to the cap main body and the joint portion is locked into the cover.

According to a third aspect of the present invention, the cover is composed of an elastic packing material, an abutting portion is disposed in the cap main body to prevent the cover from being pulled out, an outer wall of the cover firmly contacts with an inner wall of the cap main body, and the electric wires firmly contact with the hole of the cover.

Thereby, the outer wall of the elastic cover contacts resiliently with the inner wall of the cap main body. An end surface of the cover abuts to the abutting portion of the cap main body to prevent the joint portion from being pulled out. The electric wires firmly contact with the hole of the cover so that the waterproof between the cap main body and the cover and between the cover and the electric wires is improved. When the seal material is filled into the cap main body, the leakage of the seal material is assuredly prevented by the resiliently intimate contact.

According to a fourth aspect of the present invention, the cover is formed by rounding an annular plate being cut at a portion of the hole and folding into a conical shape, and an abutting portion is disposed in the cap main body to prevent the cover from being pulled out.

Thereby, when the cover is inserted into the cap main body, the cap expands in radial direction to contact firmly with the inner wall of the cap main body and abuts the abutting portion of the cap main body to prevent the joint portion from being pulled out. The joint portion is inserted into the hole of the cover and the electric wires contact resiliently with an inner wall of the hole so that the electric wires are fixed with friction between outer surfaces of the electric wires and the inner wall of the hole. When the seal material is filled into the cap main body, the intimate and resilient contact of the cover with the cap main body and the electric wires assuredly prevents the seal material from leaking. The tapered cover absorbs a tension from the electric wires like disk spring. The intimate contact between the outer surfaces of the electric wires and the inner wall of the hole becomes strong as the electric wires are pulled out.

According to a fifth aspect of the present invention, an effervescent sealing material is filled into the cap main body.

Thereby, an increased pressure caused by an expansion of the effervescent sealing material when it solidifies assists the seal material to penetrate into clearances between the cover and the cap main body, the cover and the electric wires, and the electric wires. The cover is assuredly fixed to a locking portion or abutting portion without being pulled out in spite of the expansion of the seal material.

BRIEF DESCRIPTION OF THE DRAWINGS

FIG. 3 is an exploded vertical sectional view of a third embodiment of an electric wire protective cap;

DESCRIPTION OF THE PREFERRED EMBODIMENTS

Figure 1:
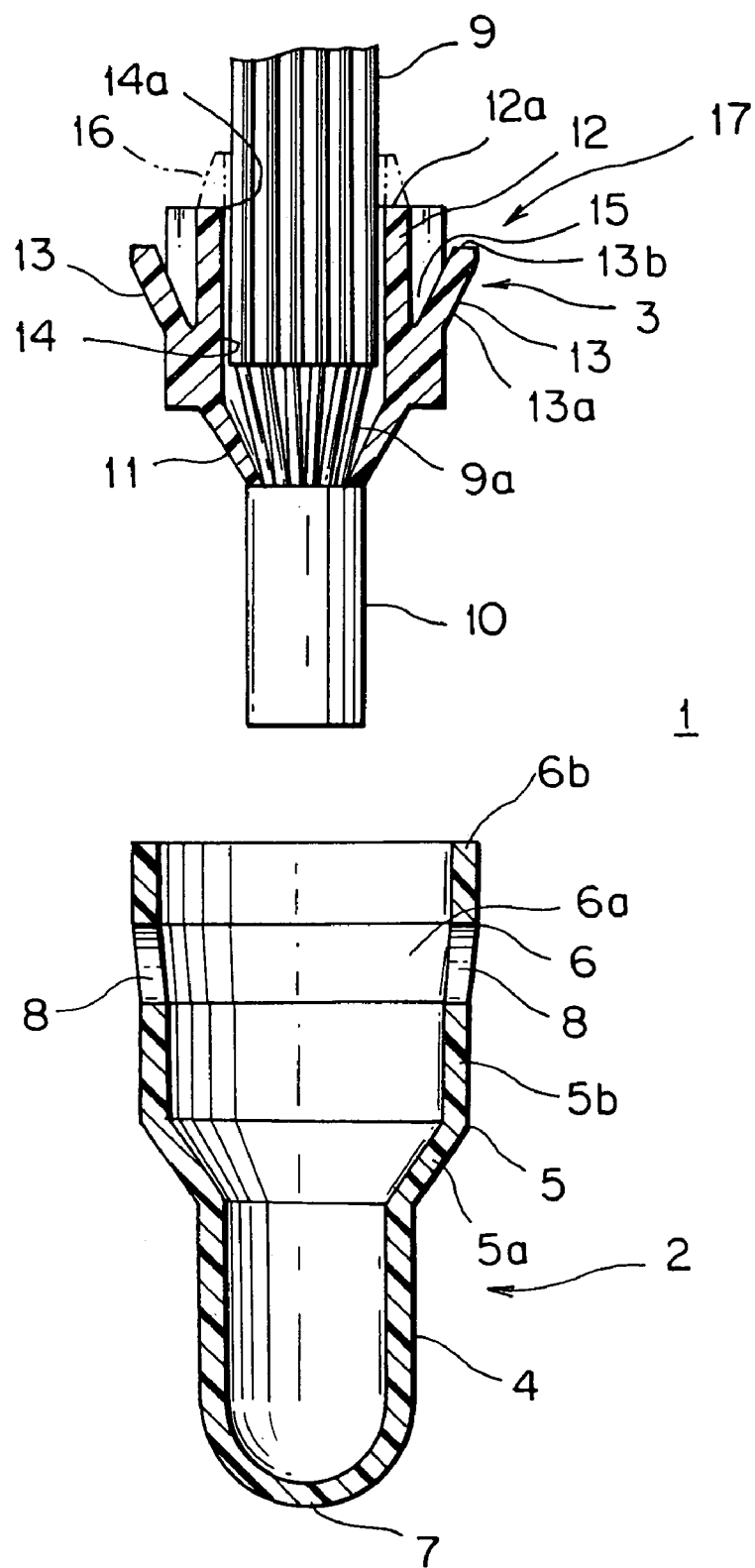
FIG. 1 is an exploded vertical sectional view of a first embodiment of an electric wire protective cap of the present invention.

FIG. 1 shows an embodiment of an electric wire protective cap according to the present invention.

The electric wire protective cap 1 has a tubular main body 2, having a bottom 7, made of a synthetic resin and a annular cover 3, made of a synthetic resin, to be locked to the main body 2. The cap main body 2 and/or the cover 3 can be formed with synthetic rubbers.

The cap main body 2 has a small diameter portion 4 at a distal end, a medium diameter portion 5 at a middle position, and a large diameter portion 6 at a rear end. The small diameter portion 4 is formed in a straight tube having the curved bottom 7 at the end. The medium diameter portion 5 has an inclined portion 5a connected to the small diameter portion 4 and an annular straight portion 5b connected to the inclined portion 5a. The large diameter portion 6 has an inclined portion 6a connected to the medium diameter portion 5 and an annular straight portion 6b connected to the inclined portion 6a. A pair of holes 8 are disposed in the inclined portion 6a of the large diameter portion 6 to be locked by the cover 3.

The small diameter portion 4 receives an electric joint portion 10, or a conductive metal sleeve (also reference numeral 10) of electric wires 9. The medium diameter portion 5 receives electric core wires 9a exposed from the electric wires 9 and locking lances (locking portion) 11 of the cover 3. The large diameter portion 6 receives a disk shaped main body 12 of the cover 3. Locking arms (locking portion) 13 engage with the holes 8 for locking.

The cover 3 includes the disk shaped main body 12 having a hole 14 at the center, the pair of the flexible locking arms 13 outwardly extending from the main body 12 and integral therewith, and the flexible locking lances 11 extending forwardly and inwardly from a front end of the main body 12 and an inner surface of a hole 14.

The locking arms 13 are disposed at 180 degrees each other and the locking lances 11 are also disposed similarly. Number and positions of the locking arms 13 and locking lances 11 are not limited to the present example but can be three or more than that and disposed equally or unequally spaced.

Each locking arm 13 has a sloped guide surface 13a at a forward end and a vertical locking surface 13b at a rear end. An inner surface of the each locking arm 13 and an outer surface of the main body 12 defines a receiving space 15 for the locking arm 13 to be bent. A rear end 12a of the main body 12 extends backwardly longer than the locking surface 13b of the locking arm 13.

The locking lance 11 is formed in a rectangular or elongated plate and sloped to the center of the cover 3 with a taper. An inner diameter of ends of both locking lances 11 is smaller than that of an inner diameter of the hole 14 of the main body 12.

The joint portion 10 is formed in that the core wires 9a (conductive portion) exposed from the plurality of the electric wires 9 are inserted into the cylindrical sleeve 10 and the sleeve 10 is compressed in a radial direction by a rotary swaging machine (not shown) uniformly to secure the core wires 9a. An outer wall of the sleeve 10 is formed in a flat and smooth surface so that the sleeve 10 is inserted into the locking lances 11 and the main body 2 without sticking, and the locking is assuredly attained by the locking arms 13.

The joint portion 10 and the electric wires 9 are inserted into a rear opening 14a of the hole 14 of the main body 12 and bend the locking lances 11 outwardly. When the joint portion 10 passes through the locking lances 11, the locking lances 11 return inwardly and abut the distal ends of the locking lances 11 to the rear end of the joint portion 10 to lock the sleeve 10.

The core wires 9a led from the sleeve 10 is positioned between the inside of the locking lances 11 and a middle position of the hole 14. Sheaths of the electric wires 9 are located along the inside of the hole 14 and each electric wire 9 is led from the rear opening 14a of the hole 14. A clearance is formed between the inner wall of the hole 14 and outer surfaces of the electric wires 9. The rear end of the main body 12 can be extended, as shown by a dashed dotted line 16, to increase a contact area of the electric wires 9 with the hole 14.

By holding the cap main body 2 upright, an effervescent sealing material, such as urethane foam is filled into the cap main body 2 and then an assembly of the joint portion 10 of the electric wires 10 and the cover 3 are inserted into the cap main body 2.

The joint portion 10 is received in the small diameter portion 4 of the cap main body 2 without clearance in radial direction. The locking lances 11 are received in the medium diameter portion 5. When the cover 3 is received in the large diameter portion 6, the locking arms 13 bend inwardly and return outwardly when the locking arms 13 engage with the holes 8 and the cover 3 is locked to the cap main body 2. Since the joint portion 10 is locked by the locking lances 11, it can not be pulled out of the cap main body 2 when locking the cover 3 to the cap main body 2.

The effervescent sealing material (not shown) expands when it solidifies. As the result, increased pressure due to the expansion assists the penetration of the seal material into clearances between the inner wall of the hole 14 of the cover 3 and the outer surfaces of the electric wires 9, between the electric wires 9, between the outer wall of the cover 3 and the inner wall of the cap main body 2, and between the locking arms 13 and the holes 8. Accordingly, the clearances are sealed each other so that the waterproof of the joint portion 10 is remarkably increased.

It is also possible that the cover 3 is firstly inserted into the cap main body 2 and the joint portion 10 is inserted into the hole 14 of the cover 3 to be locked by the locking lances 11. In this case, the seal material is filled into the cap main body 2 through the hole 14 before or after inserting the cover 3.

Although the cap main body 2 includes three stepped increasing diameters in the embodiment, modifications are not limited to this shape. A shape of two stepped increasing diameters are possible. The joint portion 10 and the locking lances 11 are received in one diameter and the cover 3 is in the other diameter. The cap main body 2 can be a straight shape by making the cover 3 of FIG. 3 smaller. The locking holes 8 of the cap main body 2 can be replaced with recesses or grooves. That prevents water from entering.

When the cover 3 is formed with a synthetic rubber, a diameter of the hole 14 is made smaller than that of the bundle of the electric wires 9 so as to firmly contact the outer surfaces of the electric wires 9 with the inner wall of the hole 14. In this case, the locking lances 11 are replaced with a boss (not shown) integral with the main body 12. The boss has a smaller diameter than that of the joint portion 10 so as to abut a front end of the boss to the rear end of the joint portion 10.

The joint portion 10 can be formed by caulking or crimping instead of swaging. When the electric wire protective cap 1 is utilized in a place where the waterproof is not required, the seal material is not necessary.

Figure 2:
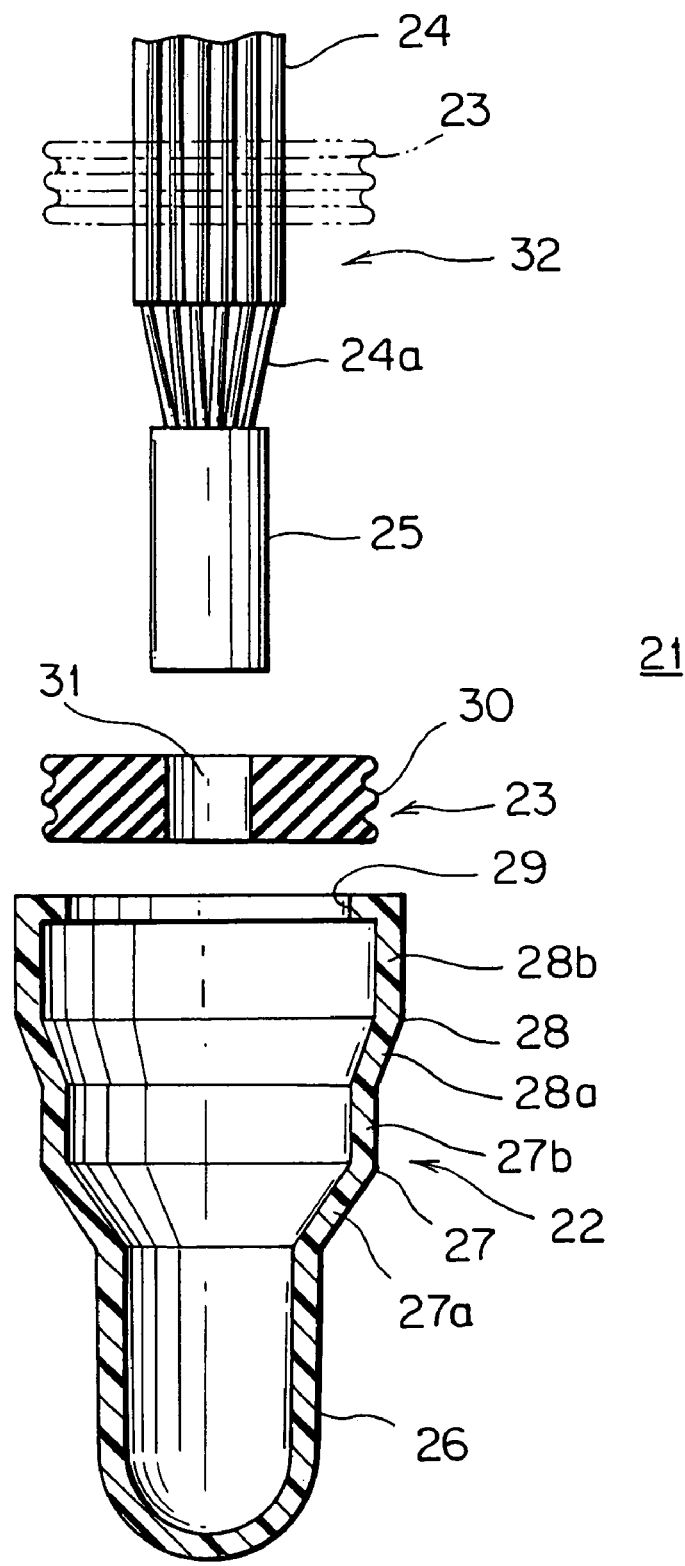
FIG. 2 is an exploded vertical sectional view of a second embodiment of an electric wire protective cap.

FIG. 2 shows a second embodiment of an electric wire protective cap according to the present invention.

The electric wire protective cap 21 includes a cylindrical cap main body 22, having a bottom, made of a synthetic resin and an annular packing cover 23, made of a synthetic rubber or an elastomer, to be fitted into the cap main body 22.

The cap main body 22 includes, similarly with the first embodiment, a small diameter portion 26, having a bottom, to receive a joint portion 25 of electric wires 24, a medium diameter portion 27 to receive core wires 24a of the electric wires 24, and a large diameter portion 28 to receive the cover 23. The large diameter portion 28 has a short flange 29 (abutting portion) extending inwardly from a rear end of the large diameter portion 28.

The flange 29 is for preventing the cover 23 from being pulled out of the cap main body 22. An outer diameter of the cover 23 is a little larger than an inner diameter of the large diameter portion 28 and the inner diameter of the flange 29 is smaller than the outer diameter of the cover 23. The medium and large diameter portions 27 and 28 are formed with inclined portions 27a and 28a and straight portions 27b and 28b.

The cover 23 has a plurality of lips 30 at an outer circumference and a hole 31 at the center to insert the joint portion 25 and the electric wires 24. The lips 30 contact resiliently with an inner wall of the large diameter portion 28. The inner diameter of the hole 31 is smaller than the outer diameter of the bundle of the electric wires 24. An inner wall of the hole 31 contacts resiliently with the outer surfaces of the sheaths of the electric wires 24 as shown by a dashed dotted cover 23. The inner diameter of the hole 31 can be smaller or larger than an-outer diameter of the joint portion 25.

The joint portion 25 is formed by swaging a metal sleeve uniformly around the sleeve similarly to the first embodiment. After the core wires 24a are crimped with the sleeve, the joint portion 25 is inserted into the hole 31 of the cover 23 so as to contact firmly the sheaths of the electric wires 24 with the inner wall of the hole 31 as shown by the dashed dotted cover 23.

An assembly 32 of the joint portion 25 and the cover 23 is inserted into the cap main body 22. The joint portion 25 is positioned in the small diameter portion 26 and the cover 23 is positioned in the large diameter portion 28 tightly. The cover 23 is fixed to the cap main body 22 and the bundle of the electric wires 24 and the joint portion 25 are fixed to the cap main body 22. The bundle of the electric wires 24 is in intimate contact with the inner wall of the hole 31 of the cover 23. The cover 23 covers tightly the cap main body 22 and provides waterproof for the joint portion 25.

In order to improve the waterproof, a seal material, especially an effervescent sealing material (not shown) is filled into the cap main body 22, and the joint portion 25 and cover 23 are inserted into the cap main body 22. The effervescent sealing material expands when it solidifies. As the result, the increased pressure due to the expansion assists the penetration of the seal material into clearances between the inner wall of the hole 31 of the cover 23 and the outer surfaces of the electric wires 9 and between the outer wall of the cover 23 and the inner wall of the cap main body 22. Accordingly, the clearances are sealed each other so that the waterproof inside of the cap main body 22 is remarkably increased.

In the second embodiment, the shape of the cap main body 22 can be two stepped or straight instead of the three stepped shape. The outer wall of the cover 23 can be flat without the lips 30 and the inner wall of the hole 31 of the cover 23 may have lips. The flange 29 of the cover 22 can be disposed in part instead of all around.

The joint portion 25 can be formed with caulking, crimping, or welding in place of swaging. When the welding is utilized, the sleeve is not used. The cap main body 22 can be a synthetic rubber in place of synthetic resin. When the protective cap is utilized in places where the waterproof is not required, the seal material is not used.

Figure 4:
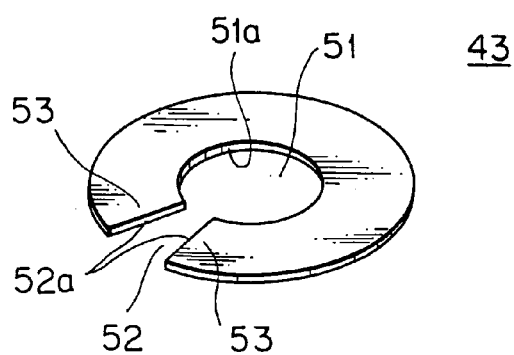
FIG. 4 is a perspective view of a cover of the electric wire protective cap of FIG. 3.
Figure 6:
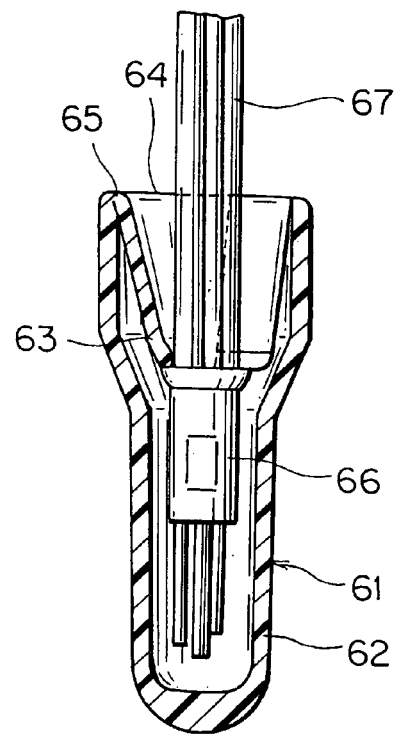
FIG. 6 is a vertical sectional view of an embodiment of a conventional electric wire protective cap.
Figure 5:
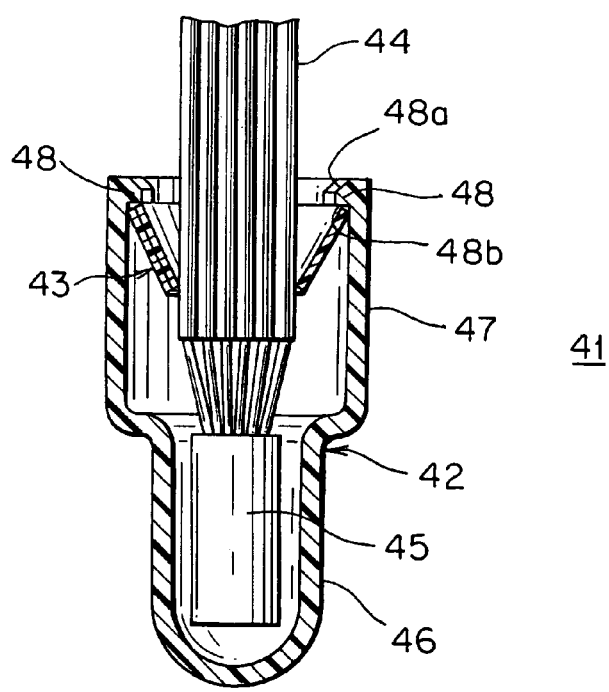
FIG. 5 is a vertical sectional view of an assembly of the electric wire protective cap of FIG. 3.

FIGS. 3 to 5 show a third embodiment of an electric wire protective cap of the present invention.

The electric wire protective cap 41 includes a cylindrical cap main body 42, having a bottom, made of a synthetic resin and a tapered plate cover 43, made of a synthetic resin, to be fitted into the cap main body 42.

The cap main body 42 has a small diameter portion 46 with the bottom to receive a joint portion 45 of the electric wires 44 and a large diameter portion 47 to receive the cover 43. A pair of opposed small flanges (abutting portion) 48 extend inwardly from an inner circumference of the large diameter portion 47.

An inner and outer walls of the small and large diameter portions 46 and 47 are connected each other through a step 49, respectively. The flange 48 has a circular shape and has a length of a quarter or less than of the circumference of an opening 50. The flange 48 has a sloped guide face 48a (FIG. 5) backward and a locking face 48b forward, perpendicular to the inner wall of the large diameter portion 47. The cover 43 is smoothly inserted into the cap main body 41 along the sloped guide face 48a.

As shown in FIG. 4, the cover 43 is initially formed in a flat disk having a hole 51 at the center to insert the joint portion 45 and the electric wires 44. The hole 51 communicates with a fan-shaped cutout 52. Both end surfaces 52a of the cutout 52 tapered outwardly and connected to outer surface of the cover 43. The cover 43 is annular excepting the cutout 52.

Both ends 53 of the cutout 52 in FIG. 4 are moved to the circumferential direction and overlapped each other in a thickness direction. As a result, the annular disk of FIG. 4 is deformed into a funnel shape or disk spring shape having a tapered annular wall 54 and the hole 51. The cover 43 is resilient in a radial direction.

The tapered cover 43 is inserted into the cap main body 42. When the cover 43 passes through the flange 48 and expands outwardly, an outer edge 55a of a rear end of the cover 43 resiliently presses the inner wall of the cap main body 42 and a rear end surface 55 abuts to the flange 48 of the cover 43.

The seal material (not shown) is then filled into the cap main body 42 after the cover 43 is inserted into the cap main body 42. The seal material flows into the cap main body 42 through the center hole 51 guided by the tapered inner wall 54 of the funnel-shaped cover 43.

As shown in FIG. 5, the joint portion 45 of the electric wires 44 is passed through the hole 51 of the cover 43 and inserted into the cap main body and the sheaths of the electric wires are fitted into the hole 51. The outer surface of the bundle of the electric wires 44 contacts with an inner surface 51a of the hole 51. When the bundle of the electric wires 44 is inserted into the hole 51, the hole 51 resiliently expands in radial direction so that the electric wires 44 are smoothly inserted into the hole 51 without sticking. The inner surface 51a of the hole 51 contacts resiliently with the outer surfaces of the electric wires 44 with a restoring force.

The cover 43 is fixed to the cap main body 42 and the electric wires 44 are fixed to the cover 43 so that the joint portion 45 is indirectly fixed to the cap main body 42. The joint portion 45 is fixed with the seal material when the seal material solidifies.

When the effervescent sealing material is utilized as the seal material, it expands when it solidifies. The pressure due to the expansion assists the seal material to penetrate into a clearance between the electric wires 44 or a clearance between an outer wall of the cover 43 and the inner wall of the cap main body 42 resulting in a perfect waterproof. The tapered cover 43 is enforced to be flat by the pressure due to the expansion so that the inner surface 51a of the hole 51 strongly contacts with the outer surfaces of the electric wires 44 resulting in higher waterproof and dust-proof.

The electric wire protective cap of the third embodiment can be utilized without the seal material when the waterproof is unnecessary. The cap main body 42 can be a straight cylinder with a bottom, not limited to the stepped types. The material of the cover 43 can be metal provided that the inner surface of the hole 51 does not have edges to damage the electric wires 44. The cover 43 can be easily formed by die cutting even synthetic resins. The flange 48 can extend all around the opening of the cap main body 42 instead of a part.

The electric wires 44 can be inserted into the cap main body 42 together with the cover 43. In this case, the seal material is filled into the cap main body 42 before insertion.

What is claimed is:

1. An electric wire protective cap comprising:
a cap main body with a tubular shape having a small diameter portion formed as a straight tube having a bottom and a large diameter portion having a hole;
a separate cover composed of one of a synthetic resin and synthetic rubber having a hole for inserting electric wires; and a separate joint portion composed of metal, formed by compressing a metal sleeve in a radial direction to enclose the electric wires and having an outer wall formed in a flat and smooth surface,
whereby the cover and the joint portion are inserted into the cap main body, and the joint portion is locked by the cover or the electric wires are fixed by the cover, and wherein core wires led from the joint portion are positioned in the hole and sheaths of the electric wires are located along an inside of the hole.

2. The protective cap as claimed in claim 1, wherein said cover has a locking portion for the joint portion and a locking portion for the cap main body.

3. The protective cap as claimed in claim 2, wherein an effervescent sealing material is filled into the cap main body.

4. The protective cap as claimed in claim 1, wherein an effervescent sealing material is filled into the cap main body.

5. The protective cap as claimed in claim 1 wherein the cap main body has a large diameter portion and the small diameter portion and the joint portion is received in the small diameter portion without clearance in a radial direction.

6. An electric wire protective cap, comprising:
a cap main body with a tubular shape having a bottom:
a separate cover composed of an elastic packing material, and having a hole for inserting electric wires; and
a separate joint portion composed of metal,
whereby the cover and the joint portion are inserted into the cap main body,
wherein an abutting portion is disposed in the cap main body to prevent the cover from being pulled out of the cap main body, a rear end of the cover abuts the abutting portion, an outer wall of the cover firmly contacts with an inner wall of the cap main body, and outer surfaces of sheaths of the electric wires firmly contact with an inner wall of the hole of the cover.

7. The protective cap as claimed in claim 6, wherein an effervescent sealing material is filled into the cap main body.

8. An electric wire protective cap, comprising:
a cap main body with a tubular shape having a bottom;
a separate cover composed of one of a synthetic resin and synthetic rubber having a hole for inserting electric wires, and a separate joint portion composed of metal,
whereby the cover and the joint portion are inserted into the cap main body, and the electric wires are fixed by the cover, wherein said cover is initially formed in a flat disk with a fan-shaped cutout and ends of the cutout are overlapped and folded into a conical shape, and an abutting portion is disposed in the cap main body to prevent the cover from being pulled out of the cap main body, a rear end of the cover abuts the abutting portion, and outer surfaces of the sheaths of the electric wires firmly conduct with an inner wall of the hole of the cover.

9. The protective cap as claimed in claim 8, wherein an effervescent sealing material is filled into the cap main body.

* * * * *